United States Patent
Son et al.

(10) Patent No.: US 8,621,298 B2
(45) Date of Patent: Dec. 31, 2013

(54) APPARATUS FOR PROTECTING AGAINST EXTERNAL ATTACK FOR PROCESSOR BASED ON ARM CORE AND METHOD USING THE SAME

(75) Inventors: Jun-Young Son, Daegu (KR); Yun-Koo Lee, Daejeon (KR); Sang-Woon Yang, Daejeon (KR); Bong-Soo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/486,009

(22) Filed: Jun. 1, 2012

(65) Prior Publication Data

US 2013/0166975 A1  Jun. 27, 2013

(30) Foreign Application Priority Data

Dec. 23, 2011  (KR) .................. 10-2011-0141332

(51) Int. Cl.
*G01R 31/3177* (2006.01)
*G01R 31/34* (2006.01)

(52) U.S. Cl.
USPC .................................. 714/727; 714/733

(58) Field of Classification Search
None
See application file for complete search history.

(56) References Cited

U.S. PATENT DOCUMENTS

| | | | |
|---|---|---|---|
| 6,154,857 A * | 11/2000 | Mann | 714/30 |
| 7,117,352 B1 | 10/2006 | Giles et al. | |
| 7,657,722 B1 | 2/2010 | De Angel et al. | |
| 2003/0074491 A1* | 4/2003 | Cepulis | 710/2 |
| 2003/0142566 A1* | 7/2003 | Sohn et al. | 365/201 |
| 2009/0169013 A1* | 7/2009 | Fascenda et al. | 380/277 |
| 2009/0222652 A1* | 9/2009 | Khan et al. | 713/2 |
| 2009/0228711 A1 | 9/2009 | Lim | |
| 2010/0153797 A1 | 6/2010 | Youm et al. | |

FOREIGN PATENT DOCUMENTS

| | | | | |
|---|---|---|---|---|
| JP | 2007304972 A | * | 11/2007 | G06F 11/28 |
| KR | 10-2009-0017858 A | | 2/2009 | |
| KR | 10-2009-0095843 A | | 9/2009 | |
| KR | 10-2010-0070027 A | | 6/2010 | |

* cited by examiner

*Primary Examiner* — Ajay Bhatia
*Assistant Examiner* — Dipakkumar Gandhi
(74) *Attorney, Agent, or Firm* — LRK Patent Law Firm

(57) ABSTRACT

An apparatus for protecting against external attacks for a processor based on an ARM core and a method using the same are provided. A method for protecting against external attacks for a processor based on an ARM core in accordance with an embodiment of the present invention includes: setting up a register using a reset handler, which is executed first within a boot image; generating a control signal for protecting against external attacks using any one of an external debug request signal and an output signal of the register; and blocking a JTAG interface used for JTAG communication with the processor based on the ARM core according to the control signal for protecting against external attacks.

12 Claims, 3 Drawing Sheets

US 8,621,298 B2

APPARATUS FOR PROTECTING AGAINST EXTERNAL ATTACK FOR PROCESSOR BASED ON ARM CORE AND METHOD USING THE SAME

CROSS-REFERENCE TO RELATED APPLICATION

This application claims priority to Korean Patent Application No. 10-2011-0141332 filed on Dec. 23, 2011, which is incorporated herein by reference in its entirety.

BACKGROUND OF THE INVENTION

1. Field of the Invention

Exemplary embodiments of the present invention relate to a microprocessor, and particularly, to a technology for coping with external attacks through a debugging interface in a system based on an ARM core.

2. Description of Related Art

A microprocessor system based on an ARM core has been widely used in various technological products, for example, storage devices such as a smart phone, a tablet PC, a hard disk drive (HDD), or the like, various communication devices, a wireless mouse, home appliances, electronic devices, various types of sensors, etc.

A joint test action group (JTAG) has generally been used in order to develop and verify products based on the ARM core. That is, in many systems in which microprocessors are used, the development and verification of products have been conducted by using the JTAG as a debug port for debugging.

In the processor based on the ARM core, an external debug request signal (EDBGRQ) generates a halting debug event, which causes a processor to enter into a debugging state.

External signals, such as JTAG, EDBGRQ, and the like, can threaten security by taking control of the processor, accessing a register or a memory, or the like. That is, attempts to obtain important information or modulate data by accessing a system using JTAG have been frequently conducted.

Therefore, systems that use the signals have security vulnerability. Therefore, various attempts have been made to solve the problem.

U.S. Pat. No. 7,117,352 discloses a method for inactivating a debug port for a JTAG debugging interface by providing one-time-programmable (OTP) memory and using an internal ROM. However, the method increases manufacturing costs due to the use of the OTP, and the JTAG cannot be used again once the JTAG has been inactivated using the OTP register.

That is, JTAG is currently recognized as essential to industry, and is widely used, but three interests, namely security, economics, and utilization, have been considered as important issues. Therefore, a new technology for simply and assuredly improving security for a JTAG is urgently needed.

SUMMARY OF THE INVENTION

An embodiment of the present invention is to realize security by a simple method despite the use of a JTAG, in a system based on an ARM core that provides a debugging function using the JTAG.

Another embodiment of the present invention is to effectively protect against attacks by a JTAG without using complex mechanisms such as a one-time-programmable memory or the like.

Still another embodiment of the present invention is to compensate for a security vulnerability caused by an external debug request signal (EDBGRQ) that forcibly enables debugging.

Other objects and advantages of the present invention can be understood by the following description, and will become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for protecting against external attacks for a processor based on an ARM core includes: a JTAG interface, configured to be connected with the processor based on the ARM core for JTAG communication; a control signal generator, configured to generate a control signal for protecting external attacks; and a blocking unit, configured to block the JTAG interface based on the control signal for protecting against external attacks.

The apparatus for protecting against external attacks for a processor based on an ARM core may further include a register, which is configured to be set up earlier than the connection setting for communication with the JTAG, using a reset handler, which is executed first within a boot image.

The control signal generator may include a first multiplexer configured to use an external debug request signal and a first output signal of the register as an input, and to use a second output signal of the register as a select signal.

The JTAG interface may include: a test clock port configured to apply a test clock signal to the processor; and a data output port configured to output a data signal from the processor.

The blocking unit may include a second multiplexer configured to select one of a dummy signal and a signal provided from any one of the JTAG interface and the processor according to the control signal for protecting against external attacks, and to select the dummy signal when the control signal for protecting against external attacks is activated.

The register may be configured to be set up with different values in the event that the boot image is updated.

The register may be set up to generate the control signal for protecting against external attacks so as to block the JTAG interface in an initial stage of system operation, and may be set up to generate the control signal for protecting against external attacks, so as to connect the JTAG interface after a predetermined time has elapsed.

In accordance with another embodiment of the present invention, a method for protecting against external attacks for a processor based on an ARM core includes: setting a register using a reset handler, which is executed first within a boot image; generating a control signal for protecting against external attacks using any one of an external debug request signal and an output signal of the register; and blocking a JTAG interface used for JTAG communication with the processor based on the ARM core according to the control signal for protecting against external attacks.

DESCRIPTION OF SPECIFIC EMBODIMENTS

Figure 1:
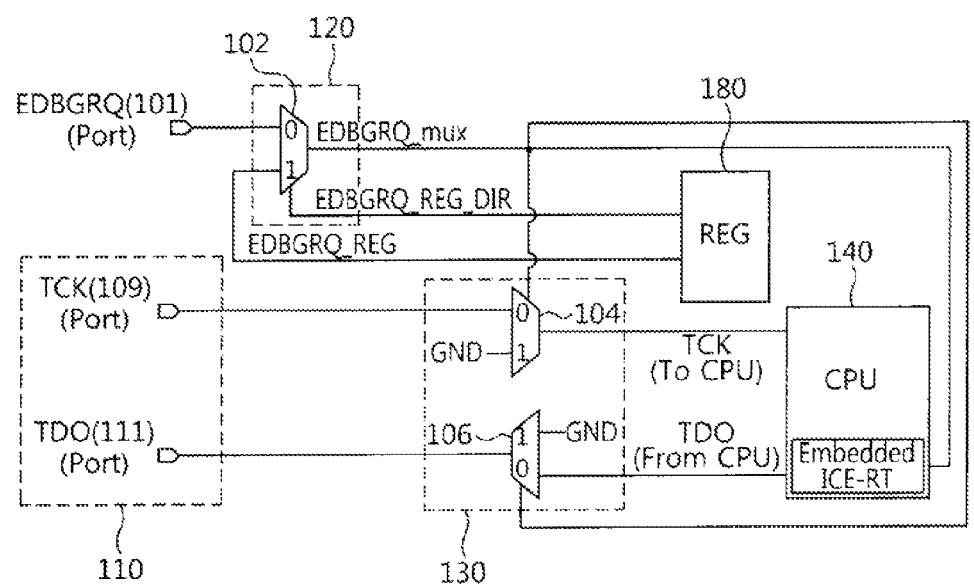
FIG. 1 is a diagram illustrating an apparatus for protecting against external attacks for a processor based on an ARM core in accordance with an embodiment of the present invention.

Exemplary embodiments of the present invention will be described below in greater detail with reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale, and in some instances, proportions may have been exaggerated in order to clearly illustrate features of the embodiments. When a first layer is referred to as being "on" a second layer or "on" a substrate, it not only refers to the case where the first layer is formed directly on the second layer or the substrate, but also the case where a third layer exists between the first layer and the second layer or the substrate.

Hereinafter, embodiments of the present invention will be described in detail with reference to the accompanying drawings.

FIG. 1 is a diagram illustrating an apparatus for protecting against external attacks for a processor based on an ARM core in accordance with an embodiment of the present invention.

Referring to FIG. 1, an apparatus for protecting against external attacks for a processor based on an ARM core in accordance with an embodiment of the present invention includes a JTAG interface 110, a control signal generator 120, a blocking unit 130, and a register 180.

In the example illustrated in FIG. 1, the processor 140 is illustrated as a portion of the apparatus for protecting against external attacks, but the apparatus for protecting against external attacks may be integrated with, or implemented separately from, the processor 140.

The JTAG interface 110 is used for JTAG communication with the processor 140 based on the ARM core.

The operational scheme of the JTAG is to artificially perform operations performed by a processor through an intermediate cell by forming boundary cells in a chip and connecting the boundary cells with external pins in a one-to-one manner. Using the above-mentioned scheme, the JTAG may be used to test various kinds of hardware, check the connection state thereof, and the like.

The JTAG interface may include a test clock port 109 for applying a test clock signal (TCK) to the processor 140 and a data output port 111 for outputting a data signal (TDO) from the processor 140. Although not illustrated in FIG. 1, the JTAG interface may further include a TDI (data input) port, which is used to input data for a test, a TMS (test mode) port, which is used to apply a control signal for switching a test mode, a TRST (reset) port, and the like.

The control signal generator 120 generates a control signal EDBGRQ_mux for protecting against external attacks.

The control signal generator 120 may include a multiplexer 102, which receives an external debug request signal EDBGRQ and an output signal EDBGRQ_REQ of a register 180, so as to select one of two inputs using an output signal EDBGRQ_REG_DIR of the register 180.

The register 180 is set up earlier than the connection setting of the JTAG communication using a reset handler, which is executed first within a boot image.

The blocking unit 130 blocks or connects the JTAG interface 110 from and with the processor 140 based on the control signal EDBGRQ_mux for protecting against external attacks.

The blocking unit 130 includes a multiplexer 106, which receives the data signal TDO and a ground signal GND, which are output from the processor 140, to select one of two inputs based on the control signal EDBGRQ_mux for protecting against external attacks, and a multiplexer 104, which receives a test clock signal TCK and the ground signal GND from the JTAG interface 110 to select one of two inputs based on the control signal EDBGRQ_mux for protecting against external attacks.

The multiplexers 104 and 106 both select the ground signal GND of two inputs when the control signal EDBGRQ_mux for protecting against external attacks is activated, so as to block the JTAG interface 110 from the processor 140.

That is, in the example illustrated in FIG. 1, the control signal EDBGRQ_mux for protecting against external attacks may be activated according to a setting value of the register 180. When the control signal EDBGRQ_mux for protecting against external attacks is activated, the multiplexers 104 and 106 of the blocking unit 130 both select the ground signal GND, which is a dummy signal, such that no security problem related to the JTAG interface 110 is created.

In the processor (or CPU) based on the ARM core, the forcible debugging function can be provided by the external debug request signal EDBGRQ. The core is brought into a halt mode by the external debug request signal EDBGRQ, at which time attacks that use JTAG communication may be performed.

In order to withstand the above-mentioned attacks, the embodiment of the present invention cannot implement the JTAG connection at the instant at which the external debug request signal EDBGRQ is activated.

In the example illustrated in FIG. 1, when the control signal of the multiplexer 102 is '0', the control signal EDBGRQ_mux for protecting against external attacks is activated when the external debug request signal EDBGRQ is activated. Since the control signal EDBGRQ_mux for protecting against external attacks is a select signal of the multiplexers 104 and 106, the ground signal GND is input as the test clock signal TCK, which is input to the processor 140, and the ground signal GND is output as the data signal TDO, which is output from the processor 140, when the control signal EDBGRQ_mux for protecting against external attacks is activated. As a result, the interface for the test clock TCK, which is incoming into the processor 140, and the data output TDO, which exits the processor, is blocked, such that JTAG communication cannot be performed.

The firmware image is stored in flash memory in the developed platform to thus activate the desired function.

In this case, when the image is downloaded to the flash memory, JTAG is mainly used, and JTAG is also used at the time of the debugging of the developed platform.

Therefore, when attackers that are not expected by a system developer attempt a JTAG connection and the attempt succeeds, it is possible for the attackers to launch a deadly attack. In order to protect against such attacks, one-time-programmable memory has been used, which entails high expenses and cannot be permanently used with the JTAG, because the one-time-programmable memory can only be set up once.

In contrast, the embodiment of the present invention controls the blocking/connection of the JTAG interface using a general register, thereby effectively blocking attacks that occur via the JTAG interface.

Figure 2:
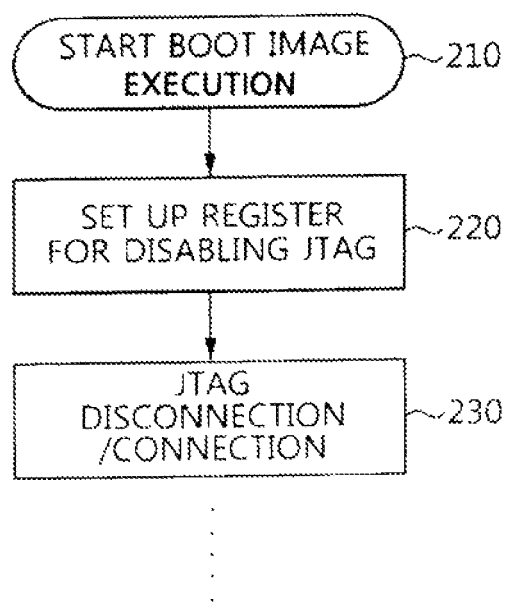
FIG. 2 is a diagram illustrating a register setting sequence, which determines blocking/connection of a JTAG interface.

FIG. 2 is a diagram illustrating a register setting sequence that determines the blocking and connection of the JTAG interface.

Referring to FIG. 2, when power is first applied or a reset is generated in the developed platform, a boot image is fetched from flash memory, and is executed (210).

The register in accordance with the embodiment of the present invention is first set up in a reset handler, which is executed first within the boot image (220).

That is, the output signals EDBGRQ_REG and EDB-GRQ_REG_DIR of the register 180, which is illustrated in FIG. 1, are used respectively as the input signal and the select signal of the multiplexer 102. It is possible to generate the desired control signal EDBGRQ_mux for protecting against external attacks according to the setting of the output signals EDBGRQ_REG and EDBGRQ_REG_DIR.

When the external debug request signal EDBGRQ is activated and the select signal of the multiplexer 102 is '0', or the output signal EDBGRQ_REG of the register 180 is activated and the select signal of the multiplexer 102 is '1', it is impossible to execute JTAG communication as described above.

In this case, the output signal EDBGRQ_REG_DIR of the register 180 is used as a select signal, which selects whether to select the external debug request signal EDBGRQ and output the selected signal, or whether to select the output signal EDBGRQ_REG of the register 180 and output the selected signal. When the output signal EDBGRQ_REG of the register 180 is selected, the external debug request signal EDBGRQ is totally blocked.

Once the JTAG connection has been successfully made, and before performing the work of making settings in the desired register in the developed platform, the core is in a halt mode, and the debugging working is then performed through the JTAG, which makes it vulnerable to external attacks.

However, as illustrated in FIG. 2, when the register setting for first blocking the JTAG interface at the time of booting is performed, it is possible to block the JTAG communication before an attempt to establish a connection for communication with the JTAG can be made. Therefore, attacks via the JTAG are fundamentally blocked. In particular, since the above-mentioned scheme uses a general register, rather than one-time-programmable memory, it is less expensive, and the register can be set up again at any time to restore the blocked JTAG interface, thereby realizing excellent reusability.

The resetting of the register may be sequentially performed at the time at which the boot image is executed (230), or may be performed by eliminating the process of setting a register immediately after the execution of the boot image by updating the boot image (220).

It is possible to improve security against JTAG attacks through the system that inactivates signals that threaten security for a predetermined clock, which is operated by the processor, and that activates/inactivates signals that threaten security within the clock time in the boot code.

When the system is first booted in hardware, JTAG communication cannot be achieved by blocking the JTAG interface. Thereafter, after the predetermined amount of time has elapsed, JTAG communication can be performed by connecting the JTAG interface.

In the above-mentioned structure, when the boot code, which inactivates signals that threaten security within the predetermined amount of time, is used, external attacks are effectively prevented, and when the activated boot code is used, the JTAG may be used again.

Figure 3:
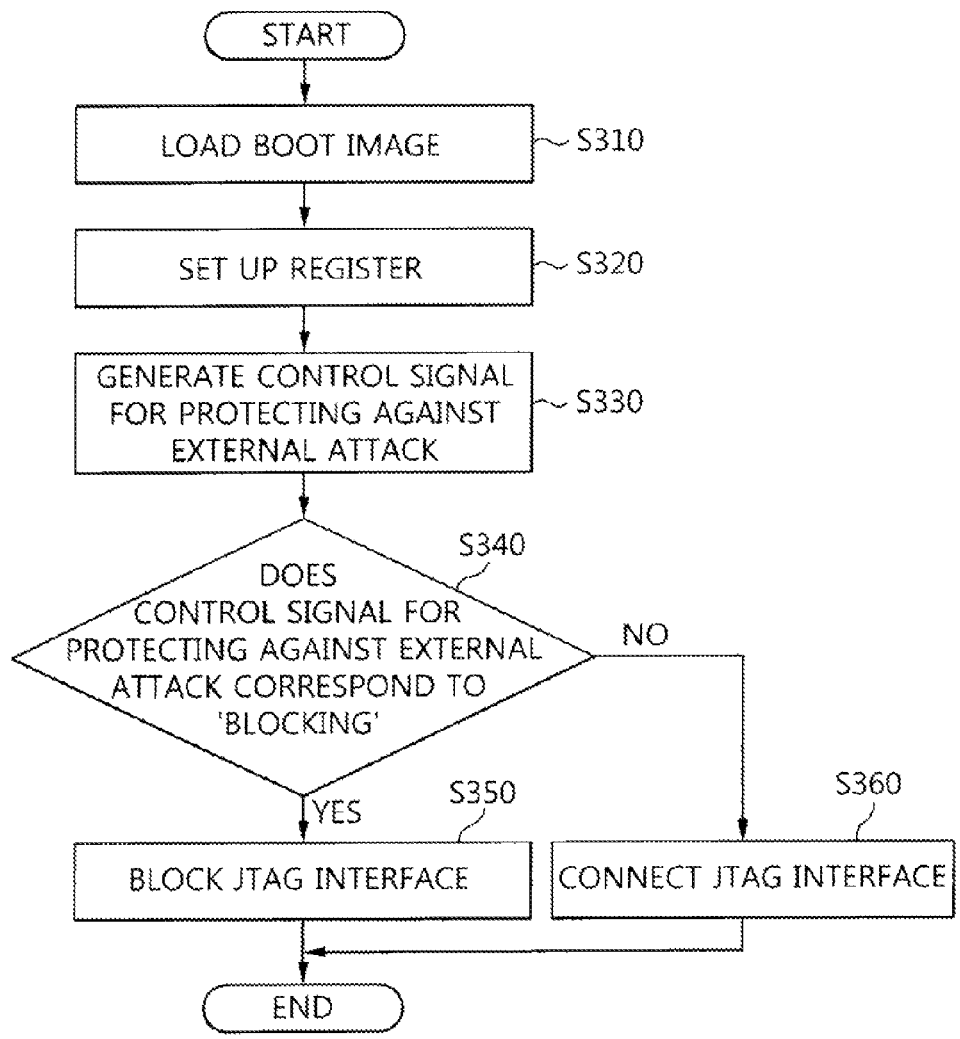
FIG. 3 is an operational flow chart illustrating a method for protecting against external attacks for a processor based on an ARM core in accordance with an embodiment of the present invention.

FIG. 3 is an operational flow chart illustrating the method for protecting against external attacks for a processor based on an ARM core in accordance with an embodiment of the present invention.

Referring to FIG. 3, the method for protecting against external attacks for a processor based on the ARM core in accordance with the embodiment of the present invention fetches the boot image from the flash memory when power is first applied, or when a reset signal is generated (S310).

Further, the method for protecting against external attacks for the processor based on the ARM core in accordance with the embodiment of the present invention sets up the register using the reset handler, which is executed first within the boot image (S320).

In this case, the register is set up earlier than the setting for the connection for JTAG communication, and thus external attacks can be blocked using the JTAG connection. For example, the register setting at S320 may be executed before any other work in the reset handler.

Further, the method for protecting against external attacks for the processor based on the ARM core in accordance with the embodiment of the present invention generates the control signal for protecting against external attacks using any one of the external debug request signal and the output signals of the register (S330).

In this case, the control signal for protecting against external attacks may be generated by the multiplexer, which uses the external debug request signal and the output signals of the register as two inputs and selects one of the two inputs based on the select signal generated by the register.

Further, the method for protecting against external attacks for the processor based on the ARM core in accordance with the embodiment of the present invention determines whether the control signal for protecting against external attacks generated at S330 corresponds to 'blocking' (S340).

As the result of the determination at S340, when the control signal for protecting against external attacks corresponds to 'blocking', the method for protecting against external attacks for the processor based on the ARM core in accordance with the embodiment of the present invention blocks the JTAG interface, which is connected with the processor based on the ARM core for JTAG communication (S350).

In this case, the JTAG interface may include the test clock port for applying the test clock signal to the processor and the data output port for outputting the data signal from the processor.

In this case, S350 may be performed by the multiplexer, which selects any one of the signal provided from any one of the JTAG interface and the processor and the dummy signal according to the control signal for protecting against external attacks. The dummy signal may be, for example, a ground signal.

As the determination result of S340, when the control signal for protecting against external attacks does not correspond to the 'blocking', the method for protecting against external attacks for the processor based on the ARM core in accordance with the embodiment of the present invention connects the JTAG interface used for the JTAG communication with the processor based on the ARM core (S360).

The register set up at S320 may be set up as different values if the boot image is updated. Further, the register set up by S320 is set up to generate the control signal for protecting against external attacks so as to block the JTAG interface in the initial state of the system operation and to generate the control signal for protecting against external attacks so as to connect the JTAG interface after the predetermined amount of time has elapsed.

As described above, the apparatus and the method for protecting against external attacks for the processor based on the ARM core in accordance with the embodiment of the present invention are not limited to the configuration and method of the above-mentioned embodiments, but can be variously modified. All or a portion of each embodiment can be selectively combined and thus configured.

In accordance with the embodiments, security can be realized using a simple method despite the use of the JTAG, in a system based on an ARM core, which provides a debug function using the JTAG.

In addition, the embodiments of the present invention can effectively protect against attacks using the JTAG, without the use of a complex mechanism, such as one-time-programmable memory or the like.

Further, the embodiments of the present invention can compensate for the security vulnerability related to the use of the external debug request signal (EDBGRQ) to forcibly enable debugging.

While the present invention has been described with respect to specific embodiments thereof, it will be apparent to those skilled in the art that various changes and modifications may be made without departing from the spirit and scope of the invention as defined in the following claims.

What is claimed is:

1. An apparatus for protecting against external attacks for a processor based on an ARM core, comprising:
   a JTAG interface configured to be connected with the processor based on the ARM core for JTAG communication;
   a register configured to be set up by a reset handler which is executed at first within a boot image;
   a control signal generator configured to generate a control signal for protecting against external attacks to selectively control blocking or connection of the JTAG interface when an external debug request signal or an output signal of the register is activated; and
   a blocking unit configured to block the JTAG interface based on the control signal for protecting against external attacks,
   wherein the register is configured to be set up before connection setting of the JTAG communication.

2. The apparatus of claim 1, wherein the control signal generator comprises a first multiplexer configured to use the external debug request signal and a first output signal of the register as an input, and to use a second output signal of the register as a select signal.

3. The apparatus of claim 2, wherein the JTAG interface comprises:
   a test clock port configured to apply a test clock signal to the processor; and
   a data output port configured to output a data signal from the processor.

4. The apparatus of claim 2, wherein the blocking unit comprises a second multiplexer configured to select one of a dummy signal and a signal provided from any one of the JTAG interface and the processor according to the control signal for protecting against external attacks and the blocking unit selects the dummy signal when the control signal for protecting against external attacks is activated.

5. The apparatus of claim 2, wherein the register is configured to be set up as different values according to an update of the boot image.

6. The apparatus of claim 5, wherein the register is set up to generate the control signal for protecting against external attacks so as to block the JTAG interface in an initial stage of a system operation, and is set up to generate the control signal for protecting against external attacks so as to connect the JTAG interface after a predetermined amount of time elapses.

7. A method for protecting against external attacks for a processor based on an ARM core, comprising:
   setting up a register by a reset handler, which is executed at first within a boot image;
   generating a control signal for protecting against external attacks by any one of an external debug request signal and an output signal of the register; and
   blocking a JTAG interface used for JTAG communication with the processor based on the ARM core, according to the control signal for protecting against external attacks,
   wherein the register is set up before a setting for connection for the JTAG communication.

8. The method of claim 7, wherein the control signal for protecting against external attacks is generated by a first multiplexer, which uses the external debug request signal and the output signal of the register as two inputs and selects one of the two inputs using a select signal generated by the register.

9. The method of claim 8, wherein the JTAG interface comprises:
   a test clock port configured to apply a test clock signal to the processor; and
   a data output port configured to output a data signal from the processor.

10. The method of claim 8, wherein the blocking of the JTAG interface is performed by a second multiplexer configured to select one of a dummy signal and a signal provided from any one of the JTAG interface and the processor, according to the control signal for protecting against external attacks.

11. The method of claim 8, wherein the register is configured to be set up as different values according to an update of the boot image.

12. The method of claim 11, wherein the register is set up to generate the control signal for protecting against external attacks so as to block the JTAG interface in an initial stage of a system operation, and is set up to generate the control signal for protecting against external attacks so as to connect the JTAG interface after a predetermined amount of time elapses.

* * * * *